United States Patent
Wang et al.

(10) Patent No.: US 11,973,662 B1
(45) Date of Patent: Apr. 30, 2024

(54) INTELLIGENT MAPPING METHOD FOR CLOUD TENANT VIRTUAL NETWORK BASED ON REINFORCEMENT LEARNING MODEL

(71) Applicant: East China Normal University, Shanghai (CN)

(72) Inventors: Ting Wang, Shanghai (CN); Puyu Cai, Shanghai (CN); Dongxu Yao, Shanghai (CN)

(73) Assignee: East China Normal University, Shanghai (CN)

( * ) Notice: Subject to any disclaimer, the term of this patent is extended or adjusted under 35 U.S.C. 154(b) by 0 days.

(21) Appl. No.: 18/240,490

(22) Filed: Aug. 31, 2023

(51) Int. Cl.
*H04L 41/14* (2022.01)
*H04L 41/16* (2022.01)

(52) U.S. Cl.
CPC ............ *H04L 41/145* (2013.01); *H04L 41/16* (2013.01)

(58) Field of Classification Search
CPC .............................. H04L 41/145; H04L 41/16
See application file for complete search history.

(56) References Cited

U.S. PATENT DOCUMENTS

| | | | | |
|---|---|---|---|---|
| 6,643,699 B1 * | 11/2003 | Liver | ...................... | H04L 45/14 709/227 |
| 10,230,661 B2 * | 3/2019 | Zhang | ................. | H04L 43/0876 |

FOREIGN PATENT DOCUMENTS

| | | | | |
|---|---|---|---|---|
| CN | 110365568 A | * | 10/2019 | |
| CN | 111585811 A | * | 8/2020 | ........... G06N 3/0454 |
| CN | 113037546 A | * | 6/2021 | |
| WO | WO-2020162211 A1 | * | 8/2020 | ......... G05B 13/0265 |

OTHER PUBLICATIONS

Gong, Long, and Zuqing Zhu. "Virtual Optical Network Embedding (VONE) Over Elastic Optical Networks." Journal of Lightwave Technology, vol. 32, No. 3, Feb. 1, 2014, pp. 450-460, https://opg.optica.org/view_article.cfm?pdfKey=1e1b34cb-cded-45cb-bdfa1db988b59d76_276476. (Year: 2014).*

* cited by examiner

*Primary Examiner* — Austin J Moreau
(74) *Attorney, Agent, or Firm* — Fish IP Law, LLP

(57) ABSTRACT

The present disclosure discloses an intelligent mapping method for a cloud tenant virtual network based on a reinforcement learning model, where a mapping algorithm is used to combine a resource abstraction model, Blocking Island, with a deep reinforcement learning algorithm, Actor-Critic, reasonably abstract underlying network resources by means of the Blocking Island model, and efficiently represent resource connectivity information of the entire network with an amount of available resources between nodes as a lower bound. The method specifically includes: (1): completing modeling of virtual network embedding; (2): modeling computing resources and bandwidth resources in a physical network; (3): constructing a neural network; and the like. Compared with the prior art, the present disclosure has better performance in average mapping cost, benefit-cost ratio, total benefit value and mapping success rate, further improves mapping accuracy, reduces the average mapping cost, and has a wide application prospect.

3 Claims, 4 Drawing Sheets

INTELLIGENT MAPPING METHOD FOR CLOUD TENANT VIRTUAL NETWORK BASED ON REINFORCEMENT LEARNING MODEL

TECHNICAL FIELD

The present disclosure relates to the technical field of cloud-edge virtual networks, and in particular, to an intelligent mapping method for a cloud tenant virtual network based on a reinforcement learning model, which is configured to process a cloud-edge virtual network request and efficiently allocate computing resources and bandwidth resources.

BACKGROUND

As a highly reusable shared environment, a cloud computing data center is equipped with a large number of physical servers and virtual machines running thereon, to provide highly reliable computing, storage, network and other resources to multi-tenants in a pay-as-you-go manner. With the continuous development of the field of cloud services, how to optimize the technology to achieve a more reasonable allocation of physical resources, so as to maximize benefits, is a problem that researchers have been thinking about. The main challenge of this research is how to effectively and dynamically allocate computing resources of the server and link bandwidth resources of a network to a virtual network (VN) defined by cloud tenants, to increase utilization of computing and bandwidth resources of an underlying network, so as to meet more tenant resource requests. This is referred to as a virtual network embedding (VNE) problem, which is mainly divided into two stages: node mapping and link mapping. Under a series of constraints and restrictions, mapping a virtual network to shared underlying physical resources is a resource allocation and scheduling issue with high computational complexity, and has been proved to be NP-hard, and algorithms for solving an optimal solution thereof have reached exponential complexity. In view of the above problems, scholars at home and abroad have carried out a lot of research work and are committed to finding the best solution to the VNE problem. Overall research results may be divided into three methods according to a mapping scheme: exact algorithm mapping, heuristic algorithm mapping, and intelligent algorithm mapping based on machine learning.

The exact algorithm solves a mapping problem by establishing a specific mathematical model. For example, the VNE problem is modeled by using some constraints, and network computing resource mapping and network bandwidth resource mapping are integrated into an integer linear programming model. However, due to a huge calculated amount, the exact algorithm cannot obtain an optimal solution in an acceptable range in a large-scale network structure, cannot be used as a feasible scheme, and has certain limitations. Therefore, many scholars propose to use a heuristic algorithm to solve the problem. For example, a greedy algorithm is used to map virtual nodes needed by tenants, or a PageRank algorithm is used to first sequence underlying network nodes and virtual network nodes before mapping. In some work, it is considered that network topology may affect node mapping, and discussion is performed accordingly. However, most heuristic algorithms for the VNE problem have fixed solution manners, and posterior data is rarely full used to continuously optimize the algorithms, so that the heuristic algorithms are prone to falling into local optimal solutions.

In recent years, many people have also tried to solve complex VNE problems by using algorithms based on machine learning. Typically, based on a distributed Q-learning algorithm, computing bandwidth resources of the underlying network are dynamically allocated. In some work, a Policy Gradient deep reinforcement learning algorithm is used to optimize the model. Through continuous interaction between an agent and the environment, a difference between an expected reward and an actual reward of the model is calculated after each mapping round, and is propagated back to the model as a loss value, so as to continuously update model parameters. The work provides a very good solution for the study of VNE problems based on reinforcement learning.

There are still some problems in VNE problem solving methods in the prior art, for example, it is difficult to simulate a real scenario, and algorithms often fall into a local optimal solution. How to implement virtual network embedding efficiently is still a hot issue worth studying.

SUMMARY

An objective of the present disclosure is to design an intelligent mapping method for a cloud tenant virtual network based on a reinforcement learning model in view of the disadvantages of the prior art, which uses an Actor-Critic deep reinforcement learning algorithm, a resource demand situation based on a virtual network and Blocking Island resource information of an underlying network to train an algorithm model capable of efficiently mapping the virtual network, and reasonably allocate underlying computing and network resources. The mapping algorithm combines a resource abstraction model, Blocking Island, with the deep reinforcement learning method, Actor-Critic, reasonably abstracts underlying network resources by means of the Blocking Island model, efficiently represents resource connectivity information of the entire network with an amount of available resources between nodes as a lower bound, thereby better implementing efficient virtual network embedding and effectively improving the resource allocation effect of a cloud data center. The method is simple and convenient and has good and wide application prospects.

A specific technical solution to implement the present disclosure is as follows: An intelligent mapping method for a cloud tenant virtual network based on a reinforcement learning model features that a mapping algorithm is used to combine a resource abstraction model, Blocking Island, with a deep reinforcement learning algorithm, Actor-Critic, reasonably abstract underlying network resources by means of the Blocking Island model, and efficiently represent resource connectivity information of the entire network with an amount of available resources between nodes as a lower bound. The method includes the following specific steps:

(1): modeling virtual network embedding (1.1): modeling a physical network equipped in a cloud data center as a weighted undirected graph $G_s=(N_s, E_s)$; and modeling the cloud tenant virtual network as a weighted undirected graph $G_v=(N_v, E_v)$, where $N_s$ and $N_v$ represent sets of vertices, and $E_s$ and $E_v$ represent sets of edges in the graph;

(1.2): node mapping, assuming that the virtual network has p nodes, $N_v=\{n_v^1, n_v^2, \ldots, n_v^i, \ldots, n_v^{p-1}, N_v^p\}$, a weight set of a weight value corresponding to each node is $M_v=\{W(n_v^1), W(n_v^2), \ldots, W(n_v^i), \ldots, W(n_v^p)\}$, determining that a condition of successful mapping is as follows: in $N_s=\{n_s^1, n_s^2, \ldots, n_s^i, \ldots, n_s^{k-1}, n_s^k\}$, finding p nodes $N_t=\{n_t^1, n_t^2, \ldots, n_t^i, \ldots, n_t^{p-1}, n_t^p\}$ so that $W(n_v^i) < W(n_t^j) \forall n_v^i \in N_v$, $\forall n_t^j \in N_t$, if there is a node impossible to be mapped to a corresponding physical node by using a mapping rule, determining that node mapping fails, or if all nodes are mapped to corresponding physical nodes, determining that the mapping is successful, and ending the mapping, where in the symbols appearing above, $N_v$ is a set of all virtual nodes of a single virtual network; $n_v^i$ represents an $i^{th}$ virtual node in the virtual network; $M_v$ is a set of weights of nodes of a single virtual network; $W(n_v^i)$ represents a weight of the $i^{th}$ virtual node; $N_s$ is a set of all physical nodes in the physical network; $n_s^i$ represents an $i^{th}$ physical node in the physical network; $N_t$ is a set of selected p physical nodes in the physical network; $n_t^i$ represents the $i^{th}$ physical node in the set of physical nodes selected for mapping; and $W(n_t)$ represents a weight of a $j^{th}$ physical node in the set of physical nodes selected for mapping;

(1.3): performing link mapping based on successful node mapping, assuming that $\{n_v^1 \to n_t^1, N_v^2 \to n_t^2, \ldots, n_v^i \to n_t^i, \ldots n_v^p \to n_t^p\}$, $(n_v^i, n_v^j)$ represents a corresponding virtual link edge connecting the node i to the node j, setting $E_v$ as a set of all virtual links in a single virtual network, and $E_t$ as a set of all virtual links in a network formed by selected physical nodes, for any single virtual link $(n_v^i, n_v^j)$ in $E_v$, finding a physical path from $E_t$ to successfully implement link mapping; assuming that the physical path is represented as $R=\{(n_t^i, n_t^a), (n_t^a, n_t^b), \ldots, (n_t^k, n_t^j)\}$, for all physical links $n_t^u, n_t^v)$ in R, meeting the following: $W(n_v^i, n_v^j) < W(n_t^u, n_t^v)$ is established, where $W(n_v^i, n_v^j)$ represents a weight of a link connecting the virtual node i and the virtual node j; and $W(n_t^u, n_t^v)$ represents a weight of a link connecting a physical node u and a physical node v; that is, if all virtual links each have one corresponding physical path mapped thereto and found from the physical network, determining that the link mapping is successful, and ending the link mapping, or if there is a virtual link impossible to be mapped to the physical network by using a mapping rule, determining that link mapping fails, and ending the mapping of the virtual network;

(2): modeling computing resources and bandwidth resources dividing mappable weights into steps ranges according to upper and lower limits of the computing resources and the bandwidth resources in the physical network, and generating steps point weight Blocking Island models and edge weight Blocking Island models with different β values, where in each Blocking Island model, each node of an underlying network of the model generates a Blocking Island model $V(\beta_n\text{-}BI)$ of computing resources and a $V(\beta_e\text{-}BI)$ of bandwidth resources, and the Blocking Island model $V(\beta_n\text{-}BI)$ is defined as a set of destination points containing at least β computing resources and including the current node, reached by traversing along the link starting from the current node; and (3): constructing a neural network selecting features from a node $n_v^i$ to be mapped and an underlying network $G_s=(N_s, E_s)$ as inputs of the neural network, and obtaining a set of probability outputs by processing parameters of each layer of the neural network, selecting a physical node with a maximum probability as a mapping object of the virtual node, calculating a current mapping error by using a reward and probability value obtained by means of a self-defined reward calculation rule, and updating parameters of the model by using a chain derivation rule during back propagation of the error.

The Blocking Island model $V(\beta_n\text{-}BI)$ of the computing resources and the Blocking Island model $V(\beta_e\text{-}BI)$ of the bandwidth resources in step (2) are generated by breadth-first search based on the physical network $G_s=(N_s, E_s)$.

Step (3) specifically includes the following sub-steps:

(3.1): constructing a neural network selecting features from the node $n_v^i$ to be mapped and the underlying network $G_s=(N_s, E_s)$ as the inputs of the neural network, updating the Blocking Island model $V(\beta_n\text{-}BI)$ of the computing resources and the Blocking Island model $V(\beta_e\text{-}BI)$ of the bandwidth resources of all physical nodes $n_s$, and finding, from these resource models and the node $n_v^i$ to be mapped, a maximum value, a minimum value and an average value of the computing and bandwidth resources, as well as an amount of computing resources needed by the node to be mapped, as the input features of the neural network, where the neural network has a four-layer network structure, which includes from front to rear: a dual-kernel convolution layer, an ReLu activation layer, a single-kernel convolution layer, and a Softmax activation layer that outputs results in the form of probability distribution;

(3.2): performing node mapping (3.2.1): selecting the virtual node that has not been mapped in $N_v$, obtaining input features of this round of mapping by means of step (3.1), inputting the input features into the convolution layer as the first layer of the neural network, and recording $M \in \mathbb{R}^{m \times f}$, an output structure after convolution of the input features being $M \cdot [w_1, w_2]$, where $w_1$ and $w_2$ are f-dimensional one-column vectors; M are the input features; m is a number of physical nodes; and f is a number of features selected for a physical node;

(3.2.2): inputting an output result of the first layer into the ReLu activation layer as the second layer, inputting an output result of the second layer into the convolution layer as the third layer, evaluating, by the single-kernel convolution layer by using learning results of the first two layers, a score of the node to be mapped that is mapped to each possible physical node, where the output result is a one-dimensional array, and the array has a length the same as the number of physical nodes and recorded as $p=[p_1, p_2, \ldots, p_k]$; and $p_j$ is a mapping score of a physical node $n_s$; and (3.2.3): inputting an output result of the third layer into the Softmax activation layer as the fourth layer, and converting scores of all physical nodes into a probability output of a corresponding size, where a node with a greater probability indicates that the physical node is more suitable as a mapping object of the virtual node to be mapped in this round, so as to implement mapping of a node group $N_v$, to be mapped;

(3.3): performing link mapping selecting a virtual link $e_v^i$ that has not been mapped in $E_v$, assuming that physical nodes corresponding to two virtual nodes connected by the link are $e_v^i$ are $n_s^i$ and $n_s^j$ respectively, and implementing a mapping process of the link group $E_v$, to be mapped as follows:

(3.3.1): selecting a link Blocking Island model corresponding to a maximum β value in the link Blocking Island model of $n_s^i$ and $n_s^j$, and finding all the physical path groups that meet requirements;

(3.3.2): finding a path with a minimum number of link edges from the above obtained physical path groups;

(3.3.3): if there is more than one path with the minimum number of link edges, selecting a path including a largest minimum weight link; and (3.3.4): if a plurality of results are outputted in step (3.3.3), randomly selecting a physical path; and (3.4): after the node mapping and the link mapping are completed, updating the parameters of the neural network model by using the reward value obtained from the mapping.

Compared with the prior art, the present disclosure has the advantages of a high mapping success rate and accuracy and a low average mapping cost. The resource abstraction model, Blocking Island, is combined with the deep reinforcement learning algorithm, Actor-Critic, underlying network resources are reasonably abstracted by means of the Blocking Island model, resource connectivity information of the entire network is efficiently represented with an amount of available resources between nodes as a lower bound, so that the mapping success rate and accuracy are greatly increased, and the present disclosure has better performance in average mapping cost, benefit-cost ratio, total benefit value and mapping success rate. The Actor-Critic deep reinforcement learning algorithm is used, an algorithm model that can map the virtual network efficiently is trained based on the resource demand situation of the virtual network and the Blocking Island resource information of the underlying network, and the underlying computing and network resources are allocated reasonably.

DETAILED DESCRIPTION OF THE EMBODIMENTS

Figure 1:
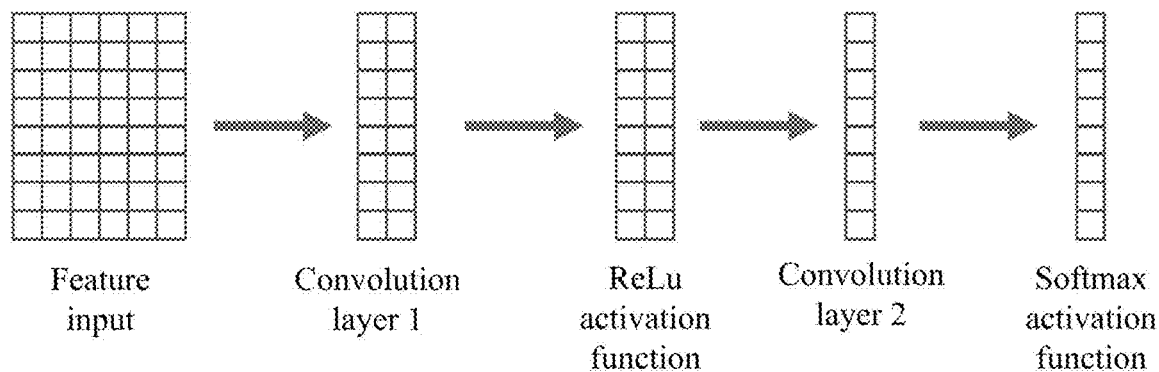
FIG. 1 is a neural network architecture diagram of the present disclosure.

The present disclosure will be further described in detail below with reference to specific embodiments.

Embodiment 1

According to the present disclosure, intelligent mapping for a cloud tenant virtual network based on a reinforcement learning model is performed based on the following steps.

(1): Model virtual network embedding.

A cloud data center is provided with a large number of physical servers, each server node has a certain amount of computing resources, and links between nodes have quantitative bandwidth resources. This network is referred to as a physical network and this physical network is modeled as a weighted undirected graph $G_s=(N_s, E_s)$. In addition, cloud tenants apply for a number of nodes, computing resources and bandwidth resources from the data center according to their own needs, and such a demand is referred to as a virtual network. Similarly, the virtual network is modeled as a weighted undirected graph $G_v=(N_v, E_v)$. $N_s$ and $N_v$ represent sets of vertices in the graph, and $E_s$ and $E_v$ represent sets of edges in the graph.

Two mapping steps, node mapping and link mapping, are performed subsequently. For node mapping, assuming that the virtual network has p nodes, $N_v=\{n_v^1, n_v^2, \ldots, n_v^i, \ldots, n_v^{p-1}, n_v^p\}$, and each node has a corresponding weight value, with a weight set of $M_v=\{W(n_v^1), W(n_v^2), \ldots, W(n_v^i), \ldots, W(n_v^p)\}$, a condition of successful mapping is as follows: In $N_s=\{n_s^1, n_s^2, \ldots, n_s^i, \ldots, n_s^{k-1}, n_s^k\}$, p nodes $N_t=\{n_t^1, n_t^2, \ldots, n_t^i, \ldots, n_t^{p-1}, n_t^p\}$, are found, so that $W(n_v^i)<W(n_t^j) \forall n_v^i \in N_v, \forall n_t^j \in N_t$. If there is a node impossible to be mapped to a corresponding physical node by using a mapping rule, the node mapping process fails, or if all virtual nodes can be mapped to corresponding physical nodes, the mapping process is successful, and the process ends.

Then the link mapping is performed. Based on successful node mapping, assuming that $\{n_v^1 \to n_t^1, n_v^2 \to n_t^2, \ldots n_v^i \to n_t^i, \ldots n_v^p \to n_t^p\}$, $(n_v^i, n_v^j)$ represents a corresponding virtual link edge connecting the node i and the node j, $W(n_v^i, n_v^j)<W(n_t^u, n_t^v)$, $(n_t^u, n_t^v) \in R$ is established if and only if $\forall (n_v^i, n_v^j) \in E_v$, $\exists R=\{(n_t^i, n_t^a), (n_t^a, n_t^b), \ldots, (n_t^k, n_t^j)\}$, indicating that all virtual links can have a corresponding physical path mapped thereto and found from the physical network, and the link mapping process is successful and ends. If there is a virtual link impossible to be mapped to the physical network by using a mapping rule, the link mapping cannot be completed. In this way, the mapping process for a virtual network has all ended.

(2): Model computing resources and bandwidth resources in the physical network.

Mappable weights may be divided into steps ranges according to upper and lower limits of the computing resources and the bandwidth resources by using an algorithm. Then steps point weight Blocking Island models and edge weight Blocking Island models with different β values are generated according to the upper limit values of these ranges. In each Blocking Island model, each node in the underlying network may generate a $V(\beta_n\text{-BI})$ and a $V(\beta_e\text{-BI})$. $V(\beta_n\text{-BI})$ is defined as a set of destination points (including a current node) containing at least β computing resources, reached by traversing along the link starting from the current node; and $V((\beta_e\text{-BI})$ represents a set of destination points (including the current node) that start the current node and pass through a link including bandwidth resources along an edge.

The Blocking Island model $V(\beta_n\text{-BI})$ of the computing resources and the Blocking Island model $V(\beta_e\text{-BI})$ of the bandwidth resources are generated by breadth-first search based on the physical network $G_s=(N_s, E_s)$.

(3): Construct a neural network.

After the neural network construction process is completed, the virtual node mapping process is implemented by using the neural network: Features are selected from a node $n_v^i$ to be mapped and an underlying network $G_s=(N_s, E_s)$ as inputs of the neural network, and a set of probability outputs is obtained by processing parameters of each layer of the neural network, and a physical node with a maximum probability is selected as a mapping object of the virtual node. Different from supervised learning, for the problem model involved in reinforcement learning, there is usually no corresponding label between state and action during training and testing, and a set of rules for calculating a reward needs to be customized. After the action is sampled and selected according to a result of forward propagation, a current mapping error is calculated by means of the calculated reward and probability value, and the parameters of the model are updated by a chain derivation rule during backward propagation of the error, so as to achieve the effect of training the model.

Step (3) specifically includes the following sub-steps.

(3.1): Construct a neural network.

When a virtual node needs to be mapped, features are selected from the node $n_v^i$ to be mapped and the underlying network $G_s=(N_s, E_s)$ as the inputs of the neural network, and a specific selection method is combined with the aforementioned resource abstraction model Blocking Island. The Blocking Island model $V(\beta_n-BI)$ of the computing resources and the Blocking Island model $V(\beta_e-BI)$ of the bandwidth resources of all physical nodes $n_s$ are first updated. Then, from these resource models and the node to be mapped, appropriate information (for example, a maximum value, a minimum value and an average value of the computing and bandwidth resources in the model and an amount of computing resources needed by the node to be mapped) is found as input features of the neural network.

Referring to FIG. 1, the neural network has four layers, which are, from left to right, a convolution layer, an ReLu activation layer, a convolution layer with only one core, and a Softmax activation layer that outputs results in the form of probability distribution.

(3.2): Implement mapping of a node group $N_v$ to be mapped.

During an iteration, the virtual node that has not been mapped in N, is selected, and input features of this round of mapping are obtained by means of step (3.1). The input features first enter the first layer in the neural network, that is, the convolution layer, whose stride is 1, and there are two convolution kernels. $M \in \mathbb{R}^{m \times f}$ is recorded, where M represents input features, m represents a number of physical nodes, and f represents a number of features selected for a physical node. Since there are two convolution kernels, after the first layer, the output structure is $M \cdot [w_1, w_2]$, where $w_1$ and $w_2$ are f-dimensional one-column vectors. Then, an output result of the first layer is transmitted to the ReLu activation layer as the second layer. The use of the ReLu activation layer not only increases a nonlinear factor of the neural network and improves the learning efficiency of the model, but also can reduce over-fitting. Then, an output result of the second layer is transmitted to the next convolution layer for processing. The main function of this layer is to evaluate, by using learning results of the first two layers, a score of the node to be mapped that is mapped to each possible physical node, where the output result is a one-dimensional array, and the array has a length the same as the number of physical nodes and recorded as $p=[p_1, p_2, \ldots, p_k]$; and $p_j$ is a mapping score of a physical node $n_s^j$. Finally, an output result of the third layer is transmitted into the Softmax activation layer, and scores of all physical nodes are converted into a probability output of a corresponding size. A node with a greater probability indicates that the physical node is more suitable as a mapping object of the virtual node to be mapped in this round.

(3.3): Implement mapping of a link group $E_v$ to be mapped.

During one iteration, a virtual link $e_v^i$ that has not been mapped in $E_v$ is selected, assuming that physical nodes corresponding to two virtual nodes connected by the link $e_v^i$ are $n_s^i$ and $n_s^j$ respectively, and the process for implementing the link mapping based on the virtual link mapping algorithm of the present disclosure is as follows.

1): Select a link Blocking Island model corresponding to a maximum β value in the link Blocking Island model of $n_s^i$ and $n_s^j$, and find all the physical path groups that meet requirements.

2): Find a path with a minimum number of link edges from the physical path groups obtained in step 1).

3): If there is more than one result obtained in step 2), select a path, which includes a largest minimum weight link.

4): If a plurality of results are further outputted in step 3), randomly select a physical path.

(3.4): After the node mapping and the link mapping are successfully completed, update the parameters of the neural network model according to the reward value obtained from the mapping. Specifically, a Critic neural network functions to obtain a TD_Error action error value after each node mapping. An Actor neural network functions to obtain a loss value of each single step by means of TD_Error, and finally propagate the loss value back to the neural network with the help of a chain derivation rule to update the model parameters.

Figure 2:
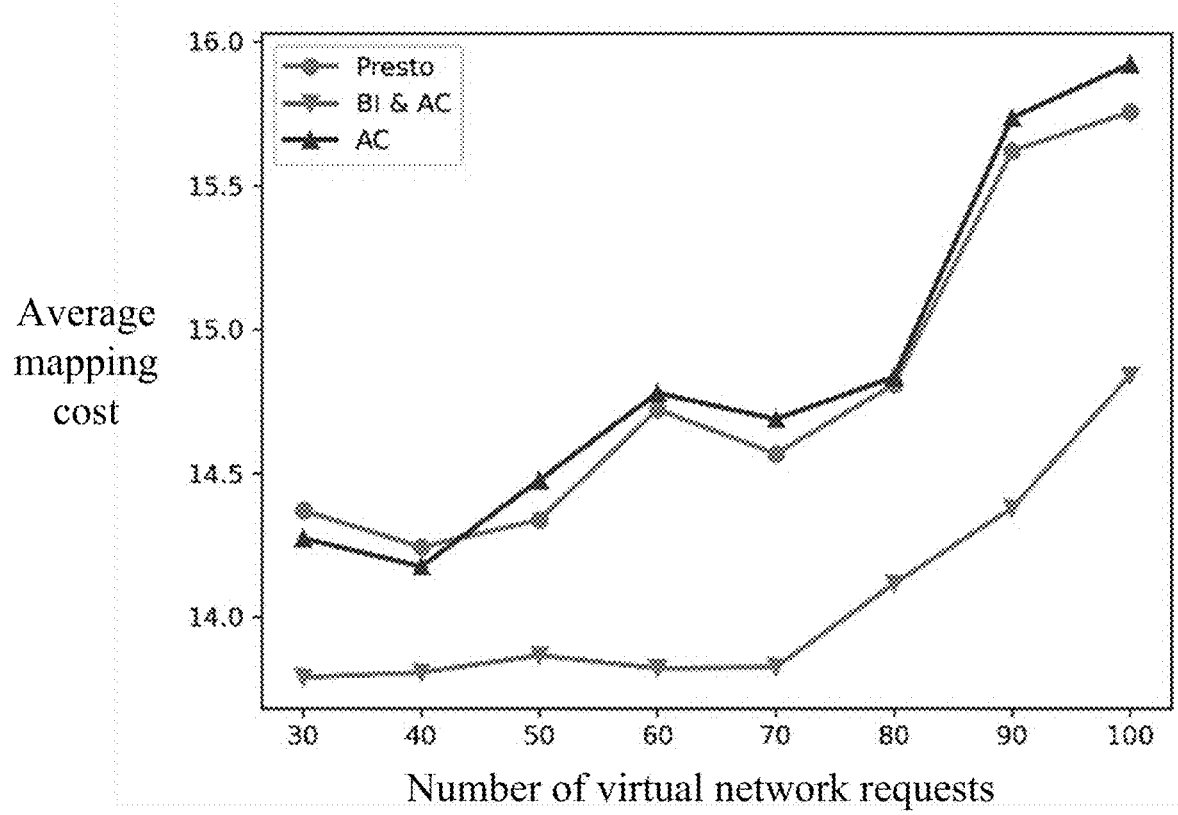
FIG. 2 is a diagram showing a comparison of average mapping cost between the present disclosure and a Presto algorithm and an Actor-Critic algorithm.

Referring to FIG. 2, it can be found from the test results that the algorithm of the present disclosure reduces the cost loss by 5% on the whole compared with the Presto algorithm; and compared with the Actor-Critic algorithm, the algorithm of the present disclosure reduces the cost loss by 10% on average.

Figure 3:
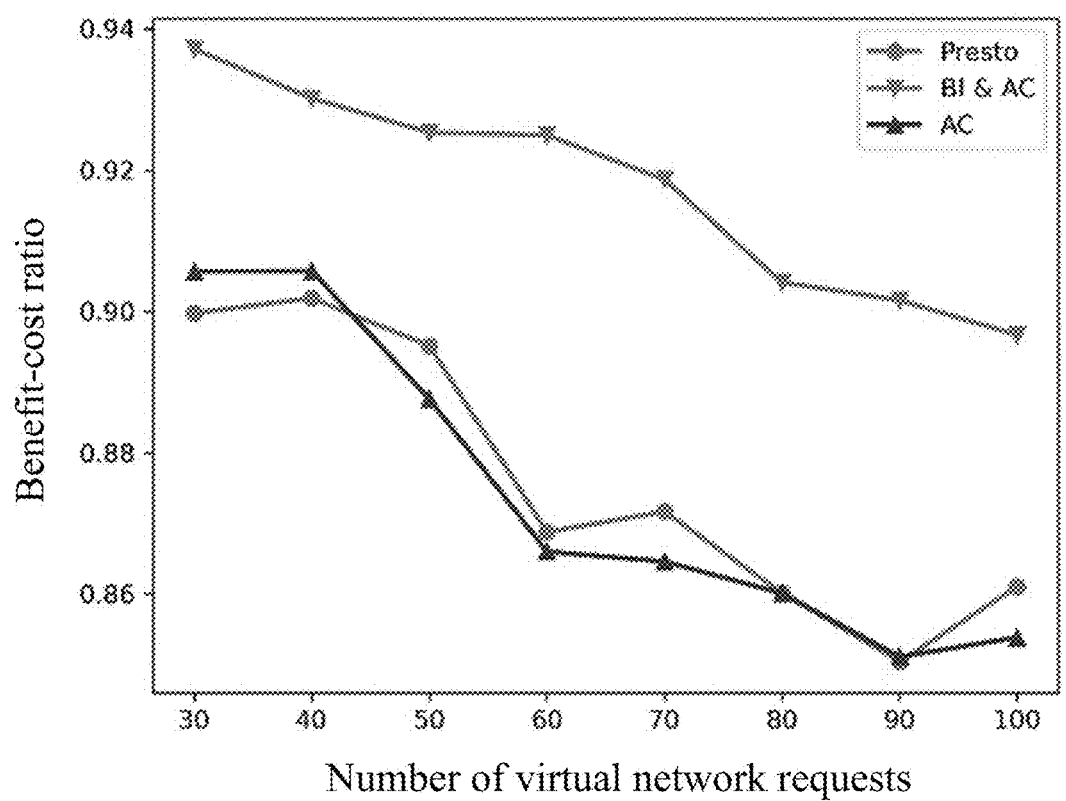
FIG. 3 is a diagram showing a comparison of benefit cost between the present disclosure and the Presto algorithm and the Actor-Critic algorithm.

Referring to FIG. 3, it can be found from the test results that the benefit-cost ratio of the algorithm of the present disclosure is 4% higher than that of the Presto algorithm on average, and is about 7% higher than that of the Actor-Critic algorithm on average.

Figure 4:
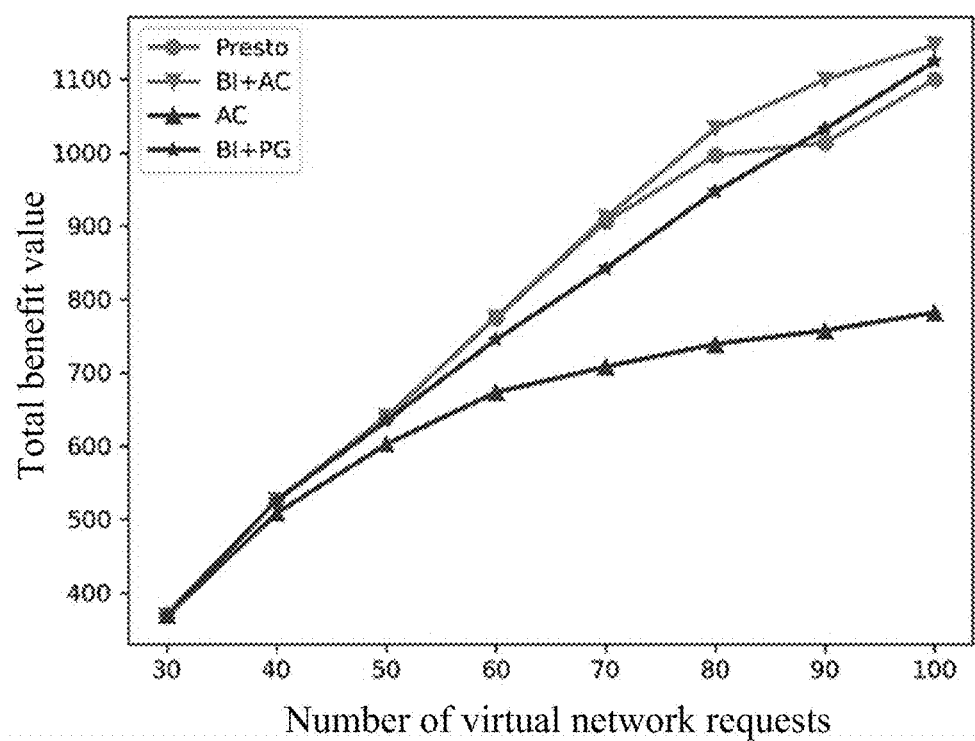
FIG. 4 is a diagram showing a comparison of total benefit value between the present disclosure, the Actor-Critic algorithm and a Policy Gradient algorithm based on a Blocking Island model.

Referring to FIG. 4, it can be found from the test results that the Presto algorithm can still maintain almost the same total benefit level as the algorithm of the present disclosure under the test set environment with 50-70 virtual networks. However, in the test set environment with a larger number of virtual networks, the algorithm of the present disclosure has certain leading advantages. A mapping strategy based only on the Actor-Critic algorithm does not have an increase amplitude as big as other algorithms, and performs worst in the test set environment with more virtual networks.

Figure 5:
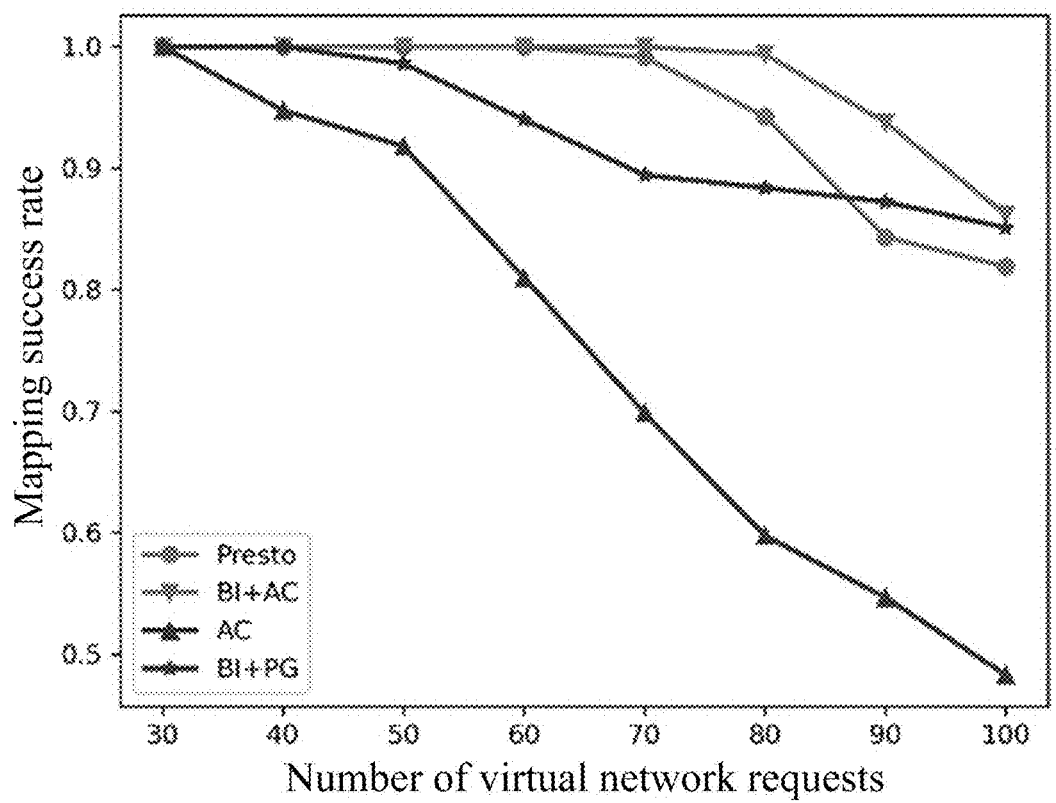
FIG. 5 is a diagram showing a comparison of mapping success rate between the present disclosure and the Presto algorithm, the Actor Critic algorithm, and the Policy Gradient algorithm based on the Blocking Island model.

Referring to FIG. 5, the algorithm of the present disclosure and the Presto algorithm still maintain a mapping success rate close to 1 in the test set environment with fewer virtual networks, while the mapping success rates of the other two algorithms decline in different degrees. In a test set with a relatively high data volume, this experimental algorithm gradually shows obvious advantages, with a decline amplitude less than those of the other three algorithms, and the algorithm can still maintain a mapping success rate of about 90% in a test set with 100 virtual networks.

In the above embodiment, three comparison algorithms are used, and are the Presto heuristic algorithm, the Actor-Critic algorithm and the Policy Gradient algorithm based on the Blocking Island model.

Compared with the above comparison algorithms, the method of the present disclosure has better performance in average mapping cost, benefit-cost ratio, total benefit value and mapping success rate. The main reason is that, compared with the Presto algorithm, the algorithm of the present disclosure makes full use of feedback information of neural network training, and dynamically adjusts and improves the mapping process during training, so that the mapping accuracy is greatly improved. Compared with the Actor-Critic comparative experimental method, the algorithm of the present disclosure uses a graph resource abstraction model to efficiently represent topological information and features of subgraphs of each part in the underlying network. Therefore, during neural network training, the features needed for mapping can be selected more finely and the model can be optimized more efficiently. Compared with the Policy Gradient algorithm based on the Blocking Island model, although the algorithm of the present disclosure does not have much advantage in average mapping cost and benefit-cost ratio, the algorithm can improve the learning efficiency of the model to a certain extent because the algorithm allows the model to update parameters in a single step, so the algorithm is relatively superior in terms of total benefit and mapping success rate.

The above is only for further description of the present disclosure and is not intended to limit this patent. Any equivalent implementation of the present disclosure shall fall within the scope of the claims of this patent.

What is claimed is:

1. An intelligent mapping method for a cloud tenant virtual network based on a reinforcement learning model, wherein an algorithm model for mapping a virtual network is used to combine a resource abstraction model with deep reinforcement learning, reasonably abstract underlying network resources by means of the resource abstraction model, and efficiently represent resource connectivity information of the entire network with an amount of available resources between nodes as a lower bound, and the intelligent mapping method for the cloud tenant virtual network specifically comprises the following steps:

(1): modeling virtual network embedding (1.1): modeling a physical network equipped in a cloud data center as a weighted undirected graph $G_s=(N_s, E_s)$; and modeling the cloud tenant virtual network as a weighted undirected graph $G_v=(N_v, E_v)$, wherein $N_s$ and $N_v$ represent sets of vertices, and $E_s$ and $E_v$ represent sets of edges in the graph;

(1.2): node mapping, assuming that the virtual network has p nodes, $N_v=\{n_v^1, n_v^2, \ldots, n_v^i, \ldots, n_v^{p-1}, N_v^p\}$, a weight set of a weight value corresponding to each node is $M_v=\{W(n_v^1), W(n_v^2), \ldots, W(n_v^i), \ldots, W(n_v^p)\}$, determining that a condition of successful mapping is as follows: in $N_s=\{n_s^1, n_s^2, \ldots, n_s^i, \ldots, n_s^{k-1}, n_s^k\}$, finding p nodes $N_t=\{n_t^1, n_t^2, \ldots, n_t^i, \ldots, n_t^{p-1}, n_t^p\}$, so that $W(n_v^i)<W(n_t^j) \forall n_v^i \in N_v, \forall n_t^j \in N_t$, if there is a node impossible to be mapped to a corresponding physical node by using a mapping rule, determining that node mapping fails, or if all nodes are mapped to corresponding physical nodes, determining that the mapping is successful, and ending the mapping, wherein $N_v$ is a set of all virtual nodes of a single virtual network; $n_v^i$ represents an $i^{th}$ virtual node in the virtual network; $M_v$ is a set of weights of nodes of a single virtual network; $W(n_v^i)$ represents a weight of the $i^{th}$ virtual node; $N_s$ is a set of all physical nodes in the physical network; $n_s^i$ represents an $i^{th}$ physical node in the physical network; $N_t$ is a set of selected p physical nodes in the physical network; $n_t^i$ represents the $i^{th}$ physical node in the set of physical nodes selected for mapping; and $W(n_t^j)$ represents a weight of a $j^{th}$ physical node in the set of physical nodes selected for mapping;

(1.3): performing link mapping based on successful node mapping, assuming that $\{n_v^1 \to n_t^1, n_v^2 \to n_t^2, \ldots, n_v^i \to n_t^i, \ldots, n_v^p \to n_t^p\}$, $(n_v^i n_v^j)$ represents a corresponding virtual link edge connecting the node i to the node j, and a physical path for achieving link mapping is $R=\{(n_t^i, n_t^a), (n_t^a, n_t^b), \ldots, (n_t^k, n_t^j)\}$, determining that all physical links $(n_t^u, n_t^v)$ in R meet: $W(n_v^i, n_v^j)<W(n_t^u, n_t^v)$ is established, wherein $W(n_v^i, n_v^j)$ represents a weight of a link connecting the virtual node i and a virtual node j; $W(n_t^u, n_t^v)$ represents a weight of a link connecting a physical node u and a physical node v, that is, if all virtual links each have one corresponding physical path mapped thereto and found from the physical network, determining that the link mapping is successful, and ending the link mapping, or if there is a virtual link impossible to be mapped to the physical network by using a mapping rule, determining that link mapping fails, and ending the mapping of the virtual network;

(2): modeling computing resources and bandwidth resources dividing mappable weights into steps ranges according to upper and lower limits of the computing resources and the bandwidth resources in the physical network, and generating steps point weight Blocking Island models and edge weight Blocking Island models with different β values, wherein in each Blocking Island model, each node of an underlying network of the model generates a Blocking Island model $V(\beta_n\text{-BI})$ of computing resources and a $V(\beta_e\text{-BI})$ of bandwidth resources, and the Blocking Island model $V(\beta_n\text{-BI})$ is defined as a set of destination points containing at least β computing resources and comprising the current node, reached by traversing along the link starting from the current node; and (3): constructing a neural network selecting features from a node $n_v^i$ to be mapped and an underlying network $G_s=(N_s, E_s)$ as inputs of the neural network, and obtaining a set of probability outputs by processing parameters of each layer of the neural network, selecting a physical node with a maximum probability as a mapping object of the virtual node, calculating a current mapping error by using a reward and probability value obtained by means of a self-defined reward calculation rule, and updating parameters of the model by using a chain derivation rule during back propagation of the error.

2. The intelligent mapping method for a cloud tenant virtual network based on a reinforcement learning model according to claim 1, wherein the Blocking Island model $V(\beta_n\text{-BI})$ of the computing resources and the Blocking Island model $V(\beta_e\text{-BI})$ of the bandwidth resources in step (2) are generated by breadth-first search based on the physical network $G_s=(N_s, E_s)$.

3. The intelligent mapping method for a cloud tenant virtual network based on a reinforcement learning model according to claim 1, wherein step (3) specifically comprises the following sub-steps:

(3.1): constructing a neural network selecting features from the node to be mapped and the underlying network $G_s=(N_s, E_s)$ as the inputs of the neural network, updating the Blocking Island model $V(\beta_n\text{-BI})$ of the computing resources and the Blocking Island model $V(\beta_e\text{-BI})$ of the bandwidth resources of all physical nodes $n_s$, and finding, from these resource models and the node $n_v^i$ to be mapped, a maximum value, a minimum value and an average value of the computing and bandwidth resources, as well as an amount of computing resources needed by the node to be mapped, as the input features of the neural network, wherein the neural network has a four-layer network structure, which comprises from front to rear: a dual-kernel convolution layer, an ReLu activation layer, a single-kernel convolution layer, and a Softmax activation layer that outputs results in the form of probability distribution;

(3.2): performing node mapping (3.2.1): selecting the virtual node that has not been mapped in $N_v$, obtaining input features of this round of mapping by means of step (3.1), inputting the input features into the convolution layer as the first layer of the neural network, and recording $M \in \mathbb{R}^{m \times f}$, an output structure after convolution of the input features being $M \cdot [w_1, w_2]$, wherein $w_1$ and $w_2$ are f-dimensional one-column vectors; $M$ are the input features; $m$ is a number of physical nodes; and $f$ is a number of features selected for a physical node;

(3.2.2): inputting an output result of the first layer into the ReLu activation layer as the second layer, inputting an output result of the second layer into the convolution layer as the third layer, evaluating, by the single-kernel convolution layer by using learning results of the first two layers, a score of the node to be mapped that is mapped to each possible physical node, wherein the output result is a one-dimensional array, and the array has a length the same as the number of physical nodes and recorded as $p=[p_1, p_2, \ldots, p_k]$; and $p_j$ is a mapping score of a physical node $n_s^j$; and (3.2.3): inputting an output result of the third layer into the Softmax activation layer as the fourth layer, and converting scores of all physical nodes into a probability output of a corresponding size, wherein a node with a greater probability indicates that the physical node is more suitable as a mapping object of the virtual node to be mapped in this round, so as to implement mapping of a node group $N_v$ to be mapped;

(3.3): performing link mapping selecting a virtual link $e_v^i$ that has not been mapped in $E_v$, assuming that physical nodes corresponding to two virtual nodes connected by the link $e_v^i$ are $n_s^i$ and $n_s^j$ respectively, and implementing a mapping process of the link group $E_v$ to be mapped as follows:

(3.3.1): selecting a link Blocking Island model corresponding to a maximum value $\beta$ in the link Blocking Island model of $n_s^i$ and $n_s^j$, and finding all the physical path groups that meet requirements;

(3.3.2): finding a path with a minimum number of link edges from the above obtained physical path groups;

(3.3.3): if there is more than one path with the minimum number of link edges, selecting a path comprising a largest minimum weight link; and (3.3.4): if a plurality of results are outputted in step (3.3.3), randomly selecting a physical path; and (3.4): after the node mapping and the link mapping are completed, updating the parameters of the neural network model by using the reward value obtained from the mapping.

* * * * *